United States Patent Office 3,605,558
Patented Sept. 20, 1971

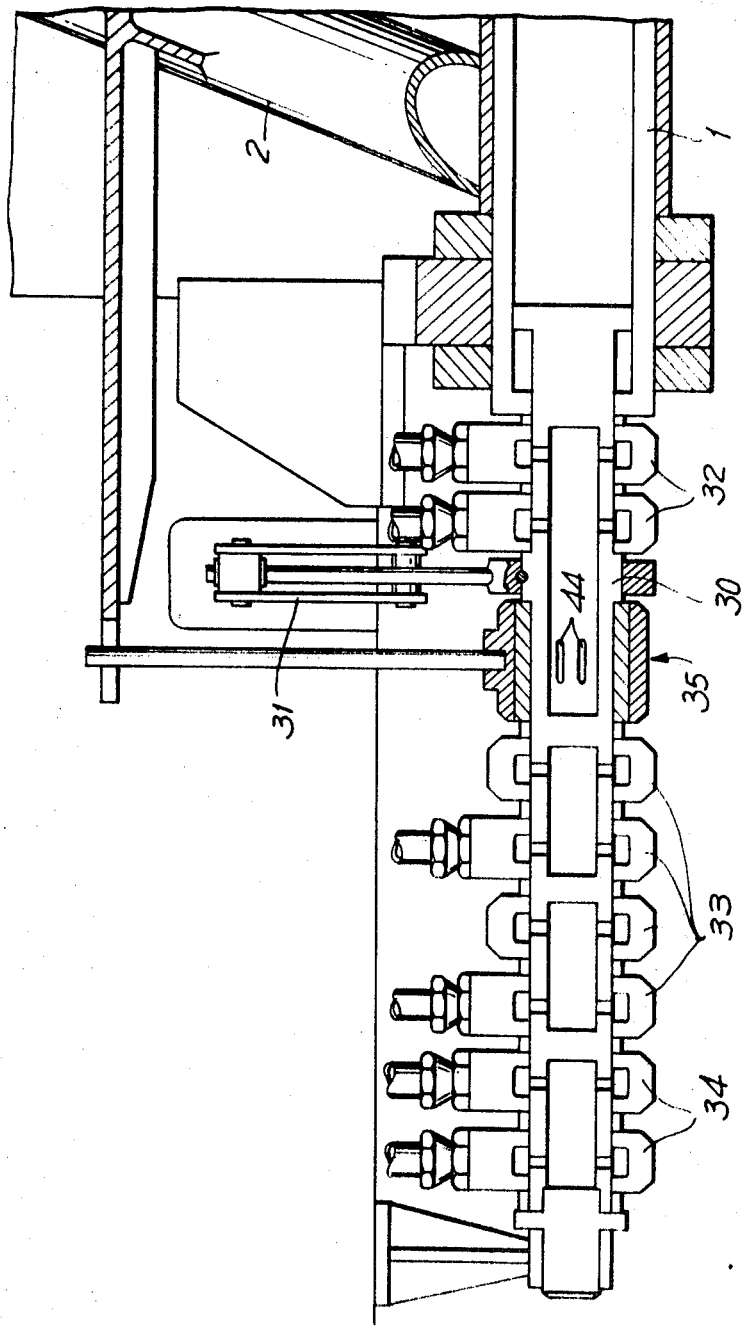

3,605,558
SCISSORS WITH A HYDRAULIC GOVERNOR FEED MEANS FOR OPENING AND CLOSING THE SAME SYMMETRICALLY
Claude Leclercq, Tarbes, France, assignor to French State, % Ministere d'Etat Charge de la Defense Nationale, Paris, France
Filed Oct. 6, 1969, Ser. No. 863,838
Claims priority, application France, Oct. 4, 1968, 168,705
Int. Cl. F01b 25/04; F15b 11/22
U.S. Cl. 91—171               9 Claims

ABSTRACT OF THE DISCLOSURE

A pair of legs pivotably connected together as a scissors carry respective jacks which are connected to a linkage in turn connected to the pivot shaft of the legs such that by operating the jacks the legs can be opened and closed. The jacks are operated by a governor which includes a follower which responds to any unsymmetrical tilting of the linkage to regulate the flow to the jacks until the linkage and legs are symmetrical.

BRIEF SUMMARY OF THE INVENTION

The protraction or retraction of two independent components of the scissor linkage type around an axis of rotation by a hydraulic drive presents a number of problems, especially that of identical motion in each of the components or legs.

During tests it became evident in fact that angular skewing of the legs relative to the bisector of the angle formed between them often occured and made the fitting of the scissor arrangement difficult.

An object of the present invention is the elimination of the aforesaid drawbacks; and it contemplates a governor-feed unit of particular construction introduced into the hydraulic circulation system to assure not only the required operation of the scissor but providing also any desirable corrections when the skewing takes place in the position of the two legs.

In accordance with the invention, each leg supports its own drive means which is constituted as a hydraulic jack, and the jacks are connected to a linkage mounted for pivotal movement about the hinge axis of the scissors. The governor includes a follower connected to the linkage for regulating flow to the jacks, if the linkage is skewed, so that the legs are constrained to occupy symmetrical positions with respect to a fixed axis whereby the latter serves as a fixed angular bisector of the angle between said legs.

BRIEF DESCRIPTION OF THE DRAWING

FIG. 4b is a sectional view taken on line IVb—IVb in FIG. 4a;

FIG. 9 shows in detail and partly in section, the part of the circuit illustrated in FIG. 3.

DETAILED DESCRIPTION

Figure 1:
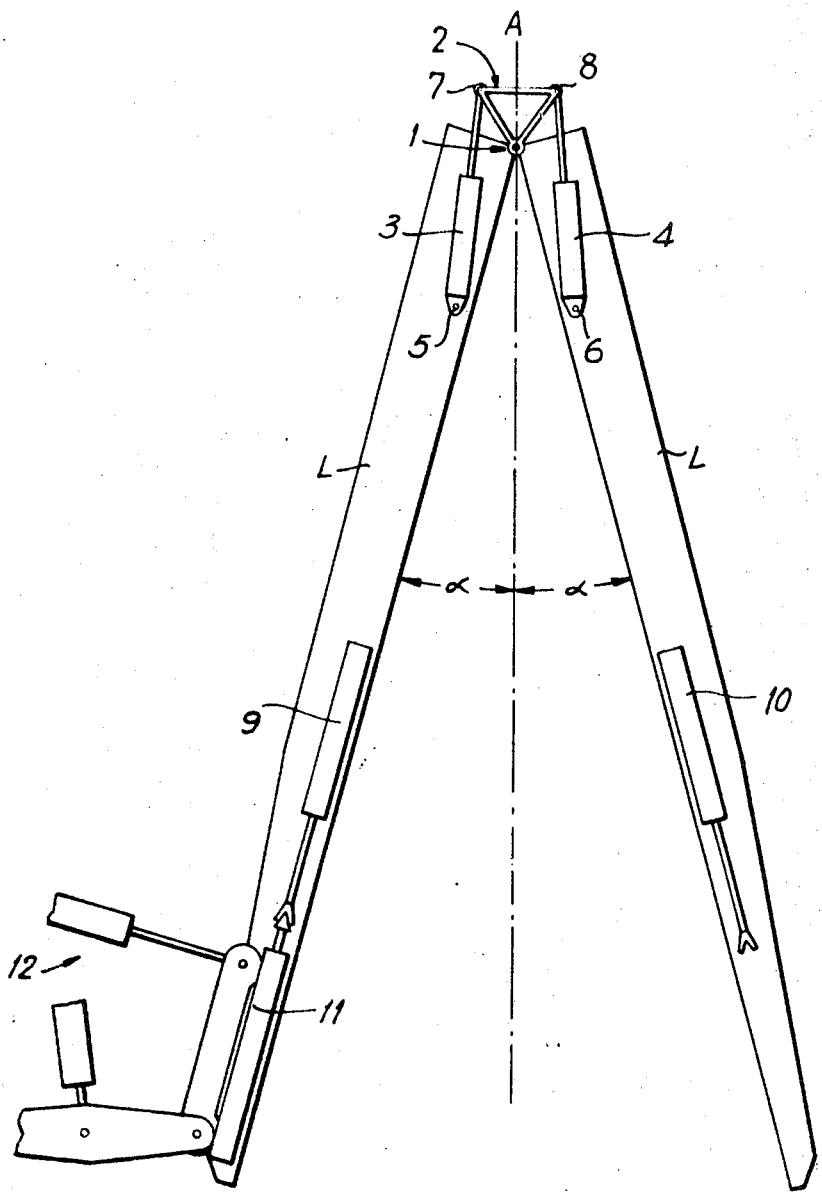
FIG. 1 is a diagrammatic elevation view of the scissors arrangement according to the invention.

Referring to FIG. 1 therein are shown a pair of legs L connected as a scissor arrangement for pivotal movement about a shaft 1 by means of a linkage 2, in the form of an isosceles triangle also mounted on shaft 1, and thrust jacks 3 and 4 connected by pivots 5 and 6 to respective legs L and by pivots 7 and 8 to the apexes of linkage 2.

It is desirable to actuate the thrust jacks 3 and 4 to open the legs L such that the legs always occupy positions at equal angular intervals $\alpha$ with respect to a fixed, reference axis A—A which is to coincide with the angular bisector of the angle between the legs.

Figure 2:
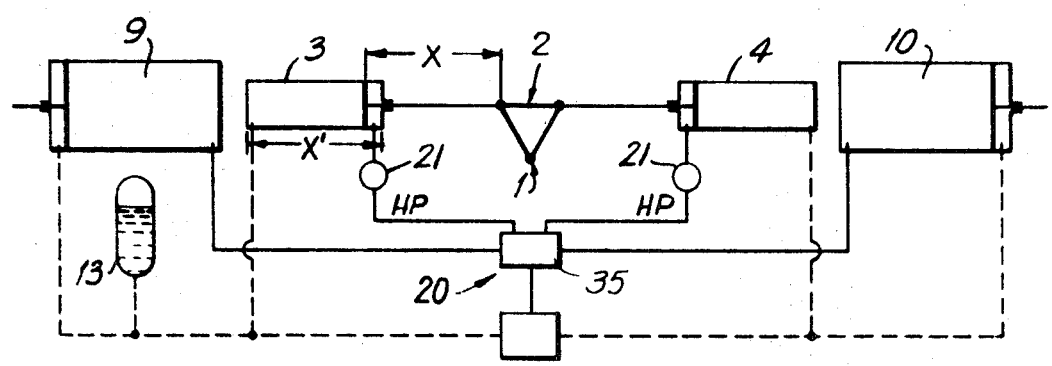
FIG. 2 is a schematic representation of a hydraulic circuit for operating the scissors arrangement.

Mounted on the legs L are pump jacks 9, 10 and these jacks 9, 10 are connected in a hydraulic circuit with the thrust jacks 3, 4 as shown in FIG. 2.

The pump jack 9 is coupled to a control jack 11 which is operated by a displacing device 12 such that the operation of the jack 9 will cause selective opening or closing of legs L through the thrust jacks 3 and 4.

As shown, because of the offset relation of shaft 1 and pivots 7 and 8, the legs will close when the jacks 3, 4 are extended and will open when the jacks 3, 4 are retracted.

All exchanges of fluid through the various parts of the system are effected in the hydraulic circuit which is closed. The circuit comprises high pressure branches shown in solid lines in FIG. 2 and low pressure branches as shown in dotted lines in FIG. 2. In the high pressure branches the fluid volume will remain substantially constant while in the low pressure branches fluctuations in volume require the presence of a pressure accumulator 13.

A feed governor 20 is inserted in the hydraulic circuit to control the feed to the thrust jacks 3 and 4 so that the legs L will always occupy equal angles $\alpha$ from the fixed axis A—A which will thereby always be coincident with the angle bisector of the angle between the legs L.

When legs L are to be opened, jack 9, for example, is contracted under the effect of an external force applied by jack 11. The pressure generated in jack 9 acts on the jacks 3 and 4 through feed governor 20. When legs L are to be closed, the motive power is then the weight of the leg with jack 10. This leg tends to rotate around shaft 1 and to extend jacks 3 and 4. The hydraulic fluid expelled from jacks 3 and 4 is restrained by the hydraulic buffers 21 and fills up through jack 9 (for example). Jack 9 pushes back the rod of jack 11. Control of the closing movement of legs L is therefore secured through control of the fluid discharge from jack 11.

Figure 3:
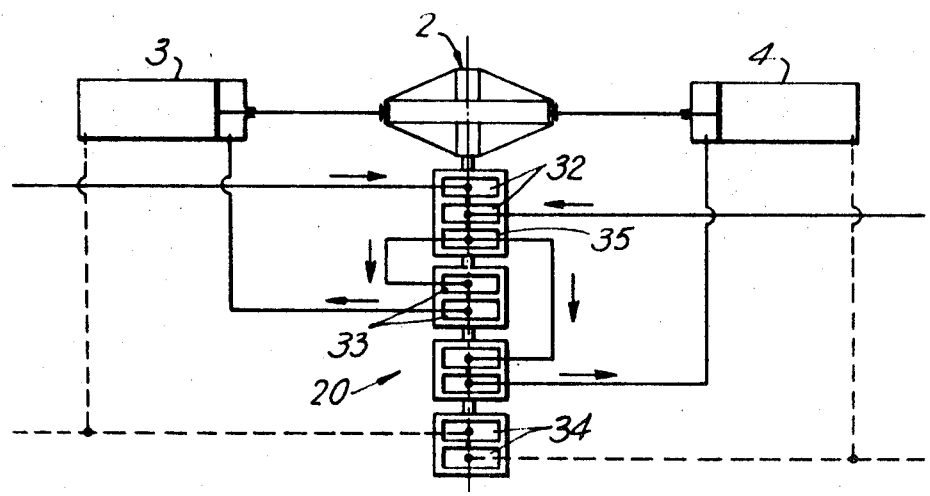
FIG. 3 is a detail in schematic form of a part of the circuit in FIG. 2.

FIG. 3 diagrammatically illustrates the feed governor 20 and FIG. 9 shows the arrangement in greater detail. The feed governor 20 serves two principal functions, to wit, (a) it effects hydraulic connection between the legs L without the use of flexible connections such as springs and the like, in a crowded and exposed area, and (b) it ensures symmetrical operation of the two thrust jacks.

The governor comprises a shaft 30 coaxial with the shaft 1 about which the legs L pivot. The shaft 30 while slewing is locked in relation to the bisector of the angle between legs L by means of a linkage 31, and mounted on the shaft 30 are eight, rotatable feed joints constituted by: two joints 32 connected to the pump jacks 9 and 10; four joints 33 connected to the thrust jacks 3 and 4; and two joints 34 connected to the low pressure return lines. The feed joints are constructed to furnish communication between the hydraulic lines of the circuit with which they are associated and their construction is known from French Pat. 1,553,032 and is of no patentable significance in the present invention. Hence the details of construction of these joints is not shown for purposes of simplification. Suffice to state that in an opening operation of the scissors, the hydraulic feed is as shown in FIG. 3 by the arrows.

The joints are suitable for operation at pressures of 400 bars.

The governor further comprises a follower unit 35 associated with the four joints 33 for selective feeding of the thrust jacks 3, 4.

Figure 4A:
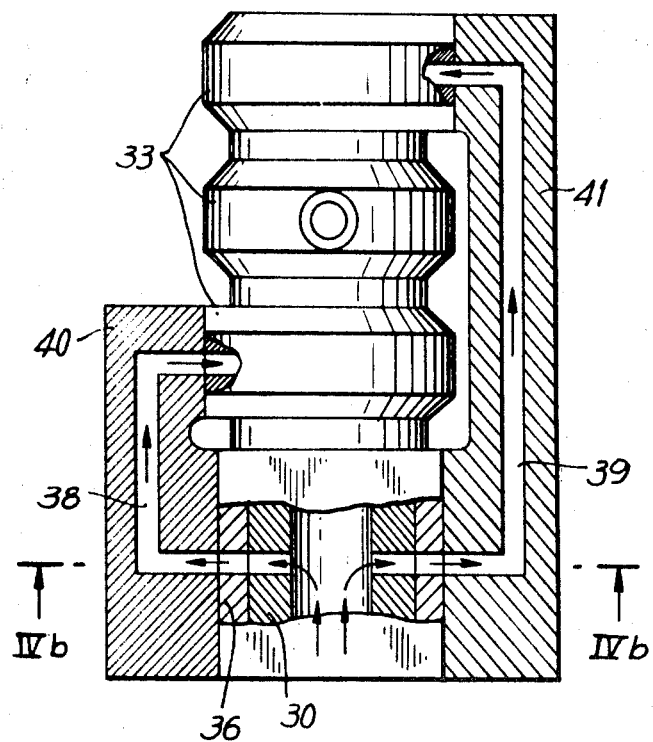
FIG. 4a is a part sectional view of a portion of the detail of FIG. 3.
Figure 4B:
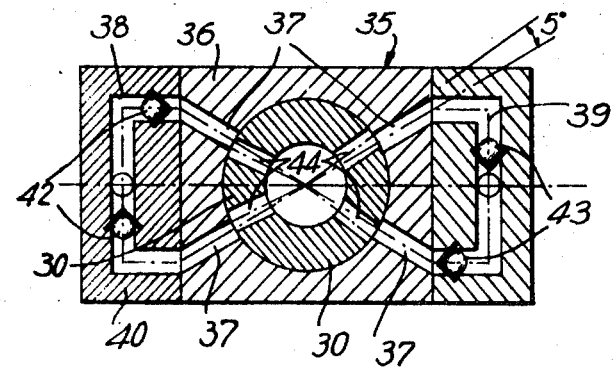

This follower unit 35 which is the characteristic feature of the invention is shown in FIGS. 4a, 4b and FIG. 9 as coaxially mounted on shaft 30 for rotation thereon.

The unit 35 comprises a housing 36 which is connected to linkage 2 for common rotation therewith. Thus housing 36 will undergo rotation with linkage 2 if the latter is angularly offset and the legs L do not form equal angles with axis A—A.

The housing 36 has four radial bores 37 connected in pairs by bores 38, 39 in two bridge sleeves 40, 41, said bores 38, 39 leading to respective joints 33 (as shown in FIG. 4a) for the feed of the thrust jacks 3, 4. Check valves 42, 43 are disposed in bores 38, and 39 respectively, and are operative in opposite directions to constrain the flow in the bores according to the direction of fluid flow. This will be explained in greater detail later.

The shaft 30 is hollow and is selectively fed with fluid jacks 9, 10 via joints 32 when the scissors is to be opened as shown in FIG. 3. The shaft 30 is provided with four radial bores 44 communicating with bores 37 in housing 36 when the legs L are symmetrically positioned with respect to axis A—A. The bores 37 and 44 are slightly offset at angles of 5° as shown in FIG. 4b to increase sensitivity.

Figure 5:
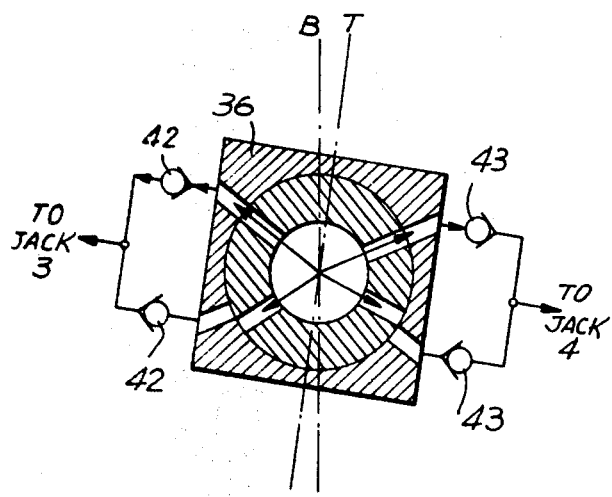
FIG. 5 is a sectional view of a portion of the structure in FIG. 4b in a different position of operation.
Figure 6:
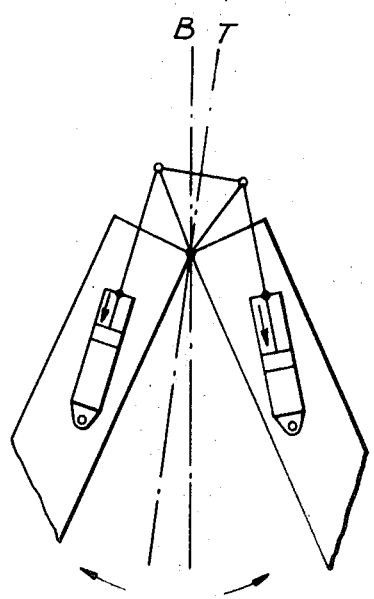
FIG. 6 shows a part of the scissors arrangement in the position corresponding to FIG. 5.

The operation of the governor 20 is as follows:

Referring to FIGS. 2 and 3, fluid (generally oil) leaves any one of the pump jacks 9, 10 at a pressure which can reach 350 bars and is fed to joints 32 which open into each other as well as to the follower unit 35. The unit 35 is open to the joints 33 which fed jacks 3 and 4. The low pressure return fluid travels to joints 34. Hence, the scissors is opened. In the event the legs of the scissors are opened unsymmetrically as shown in FIG. 5 the feed to jack 4 must be interrupted until the legs L assume a symmetrical position relative to axis A—A. This is achieved by reason of the turning of the housing 36 with the linkage 2 to the right whereby the flow of fluid to jack 3 proceeds past check valve 42 whereas flow to jack 4 is prevented by check valve 43. Consequently, the linkage 2 returns to a symmetrical position together with the legs L and the housing 36 reaches the position shown in FIG. 4b. In actuality, the feed to the jack 4 is progressively diminished while the feed to jack 3 is progressively widened. In this way, the linkage 2 resumes its symmetrical position.

Figure 7:
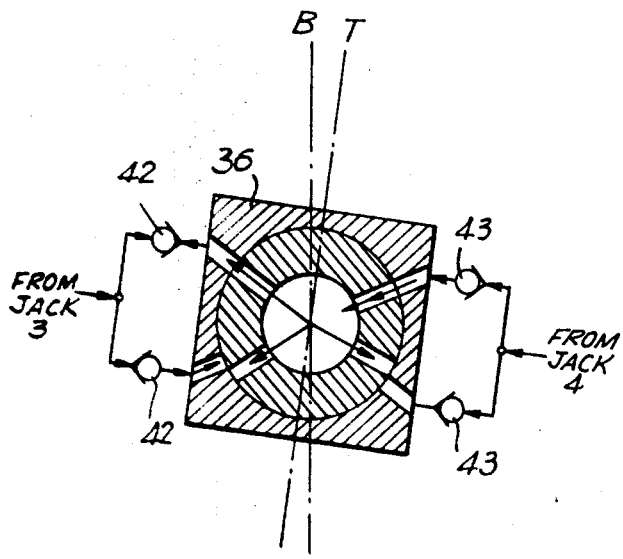
FIGS. 7 and 8 are views corresponding to FIGS. 5 and 6 for a different position of operation.
Figure 8:
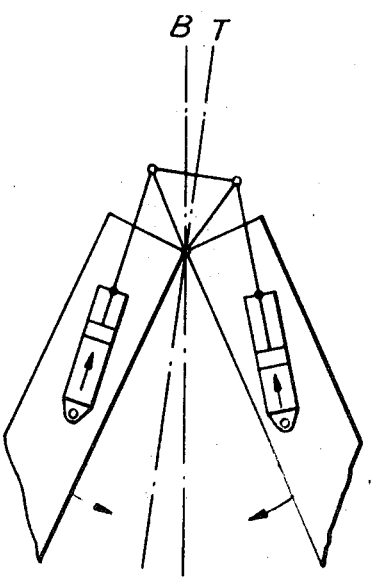

The operation which occurs upon imbalance during closure of the scissors is similar to that above. Thus, as seen in FIG. 8, the jacks 3, 4 are discharging and in order to balance the linkage 2 it is necessary to block the discharge from jack 3. This is achieved as shown in FIG. 7 wherein flow from jack 3 is blocked by check valve 42 while flow from jack 4 can pass check valve 43. The opening and closure of the flow is progressive as explained above in connection with feed to the jacks.

From the above it is seen that the governor 20, which includes follower unit 35, serves to distribute fluid to the jacks 3 and 4 to open and close the scissors while also insuring that the legs L of the scissors occupy symmetrical positions with respect to axis A—A.

What is claimed is:

1. Apparatus comprising a pair of legs, a pivot shaft pivotably connecting said legs together, means for selectively opening and closing said legs in unison and including an individual drive means for each leg, and governor means controlling the operation of the last said means in response to the position of said legs to constrain the legs to occupy positions at equal angular intervals with respect to a fixed angular bisector of the angle between said legs, said governor means comprising a follower including a fixed member coaxial with said shaft, and a rotatable member on and coaxial with said fixed member, said fixed and rotatable members having aligned bores for the flow of pressure fluid to and from said individual drive means for conjoint operation thereof, said rotatable member following unequal movement of said legs to close communication of said bores with one of the drive means thereby enabling separate operation of the other drive means until said legs have achieved equal angular positions with respect to said angular bisector.

2. Apparatus as claimed in claim 1 comprising linkage means coupling said rotatable member with said individual drive means to pivotably displace the rotatable member with respect to said fixed member in relation to unequal angular movements of said legs.

3. Apparatus as claimed in claim 2 wherein each said drive means include a thrust jack coupled to said linkage means, and a hydraulic circuit connecting the thrust jacks with said bores in the rotatable and fixed members.

4. Apparatus as claimed in claim 3 comprising a source of pressure fluid connected in said circuit to said governor means, the latter controlling flow of fluid to and from said thrust jacks.

5. Apparatus as claimed in claim 4 wherein said source of pressure fluid comprises a pair of pumping jacks connected to said governor means and to one another.

6. Apparatus as claimed in claim 1 wherein said bores are connected in pairs to respective drive means, and check valves in the bores of each pair operative in opposite directions.

7. Apparatus as claimed in claim 6 wherein said bores when aligned are offset by a relatively small angle, the bores in one pair being offset in one direction while the bores in the other pair are offset in the opposite direction.

8. Apparatus as claimed in claim 7 wherein said small angle is 5°.

9. Apparatus as claimed in claim 2 wherein said linkage means includes an isoceles triangular member having one apex pivotable about said shaft and its other apex connected to respective drive means.

References Cited

UNITED STATES PATENTS

| 2,142,089 | 1/1939 | Barrett | 91—171 |
|---|---|---|---|
| 2,378,497 | 6/1945 | Phillips | 91—171 |
| 2,706,886 | 4/1955 | Michel | 91—171 |
| 2,859,591 | 11/1958 | Zimmerman | 91—171 |

PAUL E. MASLOUSKY, Primary Examiner

U.S. Cl. X.R.

60—97E